United States Patent
Knudsen et al.

(10) Patent No.: US 9,846,062 B2
(45) Date of Patent: Dec. 19, 2017

(54) TIMESTAMPING IN WIND TURBINES

(71) Applicants: Andreas Groth Knudsen, Brande (DK); Michael Bjerre Laursen, Odense SV (DK); Flemming Bay Thunbo, Galten (DK)

(72) Inventors: Andreas Groth Knudsen, Brande (DK); Michael Bjerre Laursen, Odense SV (DK); Flemming Bay Thunbo, Galten (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1138 days.

(21) Appl. No.: 13/894,648

(22) Filed: May 15, 2013

(65) Prior Publication Data
US 2013/0317782 A1    Nov. 28, 2013

(30) Foreign Application Priority Data
May 24, 2012   (EP) ..................... 12169292

(51) Int. Cl.
 F03D 7/04     (2006.01)
 G01D 9/00     (2006.01)
 F03D 17/00    (2016.01)

(52) U.S. Cl.
 CPC .............. G01D 9/00 (2013.01); F03D 7/048 (2013.01); F03D 17/00 (2016.05); *Y02E 10/723* (2013.01)

(58) Field of Classification Search
 CPC  F03D 7/048; F03D 17/00; G01D 9/00; Y02E 10/723
 See application file for complete search history.

(56) References Cited

U.S. PATENT DOCUMENTS 7,551,130 B2    6/2009  Altenschulte
2003/0212828 A1*  11/2003  Miyazaki ............... G06Q 30/06
                                                          709/248

(Continued)

FOREIGN PATENT DOCUMENTS

CN    102710410 A  * 10/2012  ................ H04J 3/06
WO    2009068034 A1    6/2009
WO    2013026748 A1    2/2013

OTHER PUBLICATIONS

Dale E. Berg, Perry Robertson and Jose Zayas, "Atlas: A Small, Light Weight, Time-Synchronized Wind-Turbine Data Acquisition System", 1999 ASME Wind Energy Symposium, Reno, Nevada, US, Jan. 11-14, 1998, pp. 1-8.

(Continued)

Primary Examiner — Regis Betsch

(57) ABSTRACT

A method of collecting event data in a wind park installation including a plurality of wind turbines is provided. Each wind turbine includes a satellite-based clock. In each wind turbine, a first time signal is distributed from the satellite-based clock to at least one node in the wind turbine. In the at least one node, events happening in at least one subsystem connected to the node are detected. When an event is detected, event data including an information about the event is collected. For each piece of collected event data, a timestamp is added to the piece of collected event data characterizing a corresponding instant of time when the event was detected. The timestamped event data is stored for later inspection.

10 Claims, 4 Drawing Sheets

(56) References Cited

U.S. PATENT DOCUMENTS

| | | | |
|---|---|---|---|
| 2009/0102198 A1* | 4/2009 | Egedal | F03D 80/10 |
| | | | 290/44 |
| 2010/0268849 A1* | 10/2010 | Bengtson | G05B 15/02 |
| | | | 709/248 |
| 2010/0299550 A1* | 11/2010 | Bengtson | F03D 7/047 |
| | | | 713/375 |
| 2010/0305767 A1* | 12/2010 | Bengtson | F03D 7/047 |
| | | | 700/287 |
| 2011/0158806 A1 | 6/2011 | Arms | |
| 2012/0029853 A1 | 2/2012 | Baumheinrich | |

OTHER PUBLICATIONS

Dale Berg and Jose Zayas, "Accurate Time-Linked Data Acquisition System Field Deployment and Operational Experience", 20th 2001 ASME Wind Energy Symposium, Aerospace Sciences Meeting, pp. 1-10.

* cited by examiner

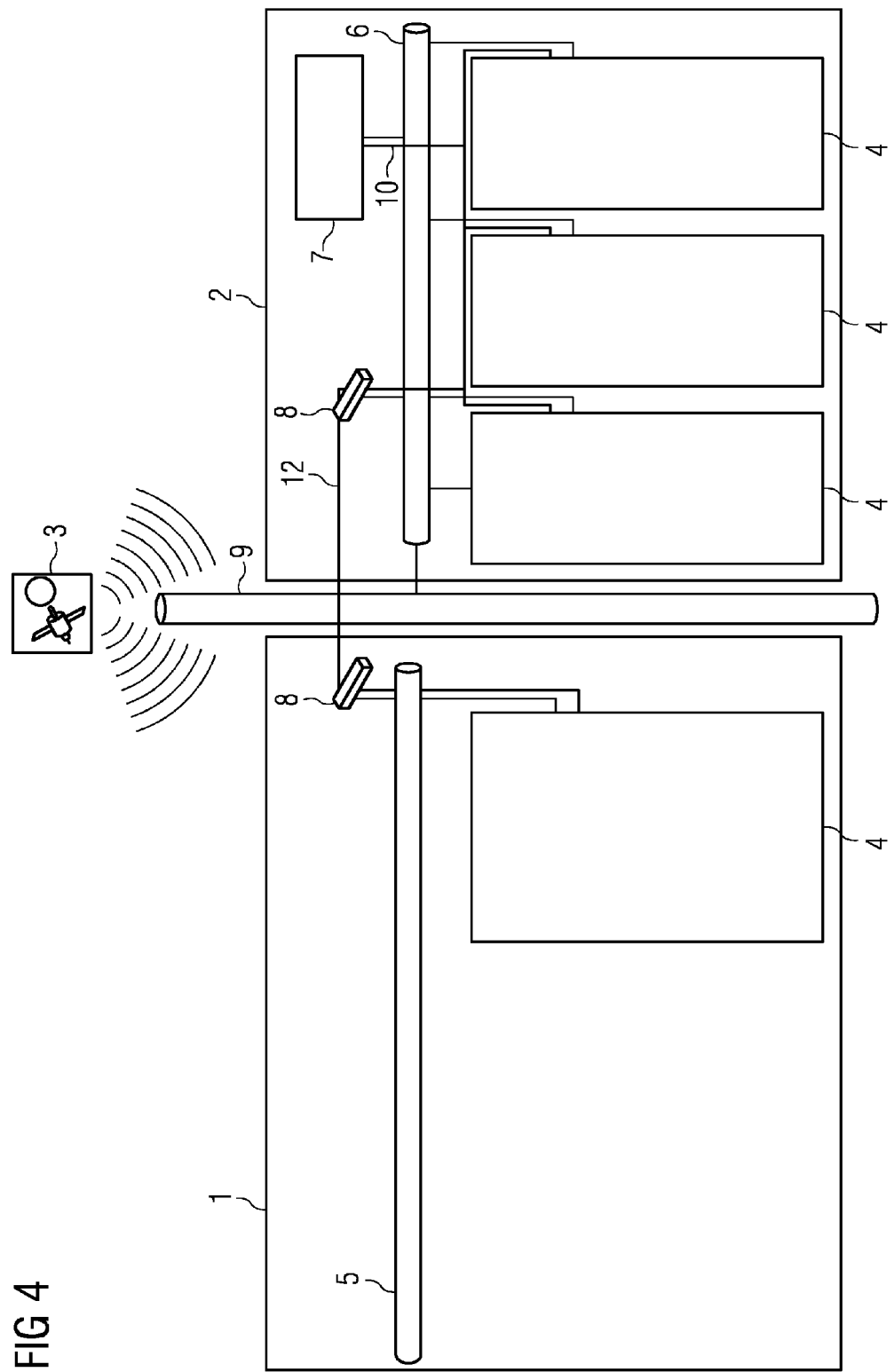

TIMESTAMPING IN WIND TURBINES

CROSS REFERENCE TO RELATED APPLICATIONS

The present application claims priority to European Patent Office application No. 12169292.5 EP filed May 24, 2012, the entire content of which is hereby incorporated herein by reference.

TECHNICAL FIELD

The invention provides a method of collecting event data in a wind park installation, a wind turbine and a substation for a wind park.

TECHNICAL BACKGROUND

Many units in wind turbines and wind parks are capable of detecting and logging events. This is true for many types of equipment that reside both locally in the wind turbines and centrally in the wind park. Many events cause reactions of one or more instances in the wind park which again may trigger further control actions. In order to analyse the reaction of the wind park as a whole and of individual wind turbines for troubleshooting of fault conditions, the logged event data needs to be inspected. For example, a grid fault may generate trips in a number of wind turbines of a wind farm. Then data such as samples with high frequency from grid measurements will be collected from all wind turbines and compared offline in order to identify the root cause of the grid fault.

This calls for a time stamping utility that enables determining the original order in which events detected at various places of a wind turbine or wind park originally happened.

It is therefore an object of the present invention to provide a method of collecting event data in a wind park installation providing accurate time information.

SUMMARY OF THE INVENTION

In view of the aforegoing the invention provides a method of collecting event data in a wind park installation comprising a plurality of wind turbines. The method comprises steps of:

Providing a plurality of wind turbines, each including a satellite-based clock;

In each of said wind turbines, distributing a first time signal from said satellite-based clock to at least one node in the wind turbine;

In the at least one node, detecting events happening in at least one subsystem connected to the node;

In the at least one node, collecting event data comprising an information about the events;

For each piece of collected event data, adding a timestamp to the piece of collected event data characterising a corresponding instant of time when the event was detected; and Storing the timestamped event data.

The method of the invention provides accurately timestamped event data which allows for in-depth analysis of events happening in the wind park. The method of the invention makes sure that event data collected at different places of the wind park or even at different wind parks can be brought together in chronological order thus giving an appropriate data base for analysing fault situations and the like. Any device in the wind turbine or wind park receiving the first time signal or other time signals that collects event data is considered a "node" in the meaning of the invention.

Preferably the satellite-based clock may be a Global Positioning System GPS based clock, in particular a Pulse Per Second clock of a GPS receiver. GPS is globally available and offers high precision. GPS receivers are widely available at relatively low cost.

A local time server may be provided in each of the wind turbines. Distributing the first time signal may include synchronising the local time server to the satellite-based clock and providing the first time signal from the synchronised local time server to the at least one node. The local time server can provide the first time signal to a plurality of nodes using standard methods for synchronisation over networks.

Preferably providing the first time signal from the synchronised local time server to the at least one node is done by means of the Precision Time Protocol PTP. The PTP is standardised and offers good precision of time synchronisation. Generally a preexisting data network present in the wind turbine may be used for sending and receiving PTP packets.

Alternatively a central time server may be provided in a substation of the wind park. The term "substation" refers to a central part of a wind park where a park controller for controlling the wind turbines of the wind park and often a park controller may be located. The method of the invention may comprise a step of distributing a second time signal from the central time server to the at least one node of each wind turbine. The central time server provides for lower overall cost but will typically offer a lower precision time. Accordingly clocks synchronised to the central time server are more suitable for detecting events that require a lower precision of timestamping.

Preferably the second time signal may be distributed by means of the Network Time Protocol NTP. The NTP offers a lower precision than the PTP but the time and effort for implementation is much lower.

A local clock may be provided in the at least one node of each wind turbine. The local clock may be synchronised to the central time server. The local clock can be used for providing the time for the timestamping utility. It can run independently from the central time server but its precision will depend on how often it is synchronised to the central time server. The local clock can provide time even when a network failure impedes access to the central time server.

In some embodiments of the invention adding the timestamp may comprise adding a first timestamp based on the first time signal and a second timestamp based on the second time signal. Using both the first and the second time signals for timestamping improves accuracy of the timestamp. Furthermore it becomes possible to evaluate the temporal relation between the two time signals. This can be used to put event data timestamped referring to only one of the time signals into context to data timestamped referring to the other of the two time signals.

Each wind turbine may comprise a first group of nodes and a second group of nodes. The first group of nodes may add the first timestamp to the respective collected event data collected by the first group of nodes and the second group of nodes may add the second timestamp to the respective collected event data collected by the second group of nodes. In this way data for which a high accuracy of time is required will be stamped with the more accurate first time signal derived from the satellite-based clock while other nodes collecting less critical event data use the second time signal.

The method may also comprise a step of combining the first and the second time signals to create a third time signal. Then adding the timestamp may comprise adding a third timestamp based on the third time signal. When the two time signals are combined, a more accurate third time signal may be derived which can be used for timestamping.

A second aspect of the invention provides a wind turbine comprising a satellite-based clock, at least one node adapted to detect events happening in at least one subsystem connected to the node, to collect event data comprising an information about the events, to add a timestamp to each piece of collected event data characterising a corresponding instant of time when the event was detected and to store the timestamped event data.

A further aspect of the invention provides a substation for a wind park and comprising a central time server adapted to distribute a time signal to a plurality of wind turbines.

These and other features, aspects and advantages of the invention will become better understood with reference to the following description and drawings. Throughout the drawings the same reference numerals will be used for identical or functionally equivalent items. Redundant description may be omitted for the sake of conciseness.

SHORT DESCRIPTION OF THE DRAWINGS

The invention will now be described in more detail, by way of example only, with reference to the accompanying drawings in which:

FIG. 4 shows a fourth embodiment of a wind park using the method of the invention.

DETAILED DESCRIPTION OF THE DRAWINGS

Figure 1:
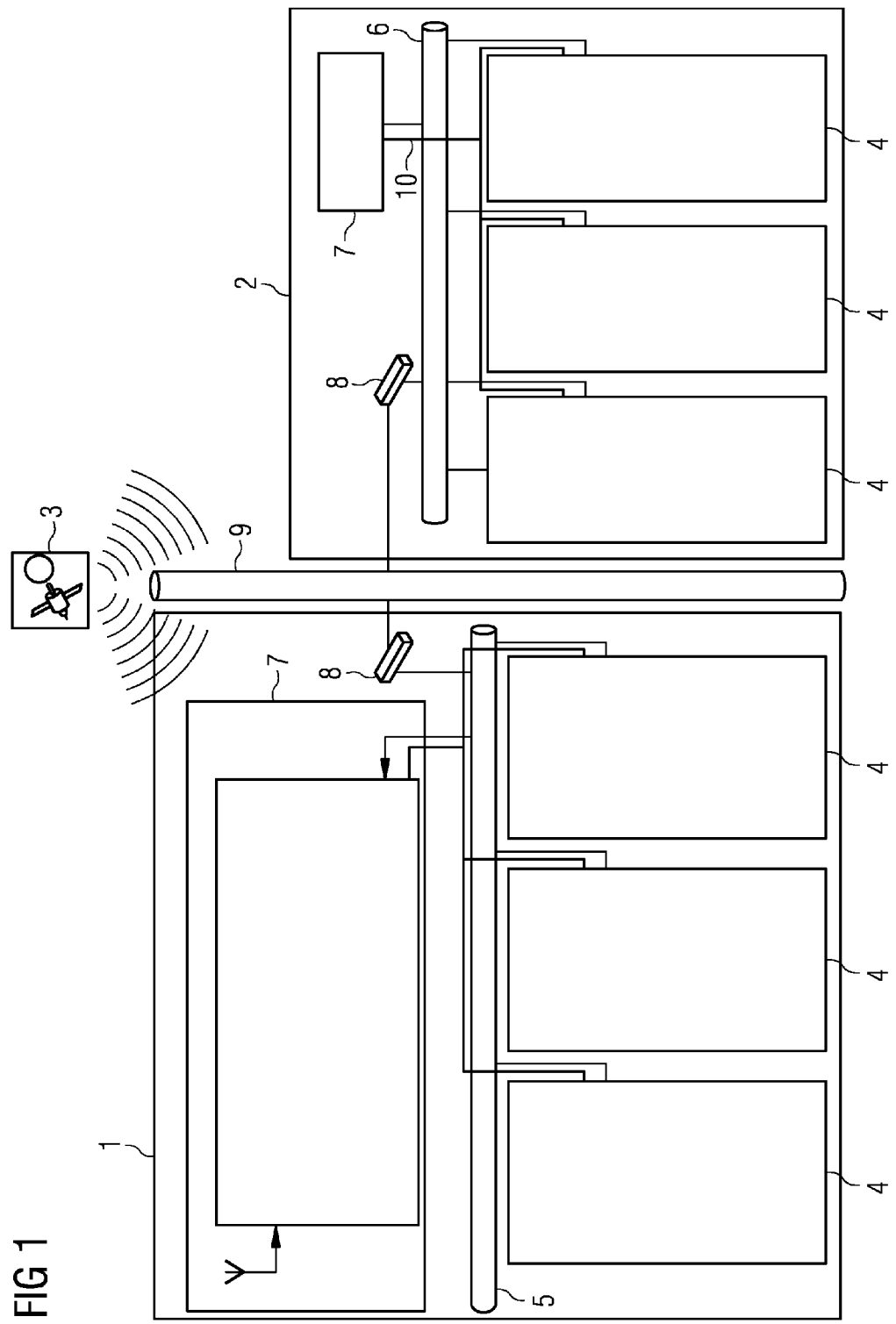
FIG. 1 shows a first embodiment of a wind park using the method of the invention.

FIG. 1 shows a first embodiment of a wind park using the method of the invention. In the wind park a plurality of wind turbines are connected to a substation 2. In the drawings only one wind turbine 1 is shown, however, the number of wind turbines in the wind park will usually be in the range of tens to hundreds of wind turbines. According to the first embodiment both the wind turbine and the substation 2 may comprise satellite-based clocks 7 receiving signals from a plurality of satellites 3. These satellite-based clocks may be GPS receivers. According to the first embodiment these satellite-based clocks may comprise time servers which are preferably implemented as PTP servers. The time servers communicate with local nodes 4 over internal networks 5 and 6, respectively, by sending synchronisation data 10 over the networks. The synchronisation data 10 may be the first time signal. The time servers preferably synchronise to UTC.

Each of the nodes 4 comprises a local clock whose time will be adjusted to that of the corresponding PTP server. The networks 5 and 6 of the wind turbine 1 and the substation 2, respectively, are connected to each other via switches 8 and a wind farm network 9. The nodes 4 of the wind turbine 1 may include a main computer, a turbine interface computer and other nodes that require timestamping. The nodes 4 of the substation 2 may include a park server, a park pilot and other nodes.

Figure 2:
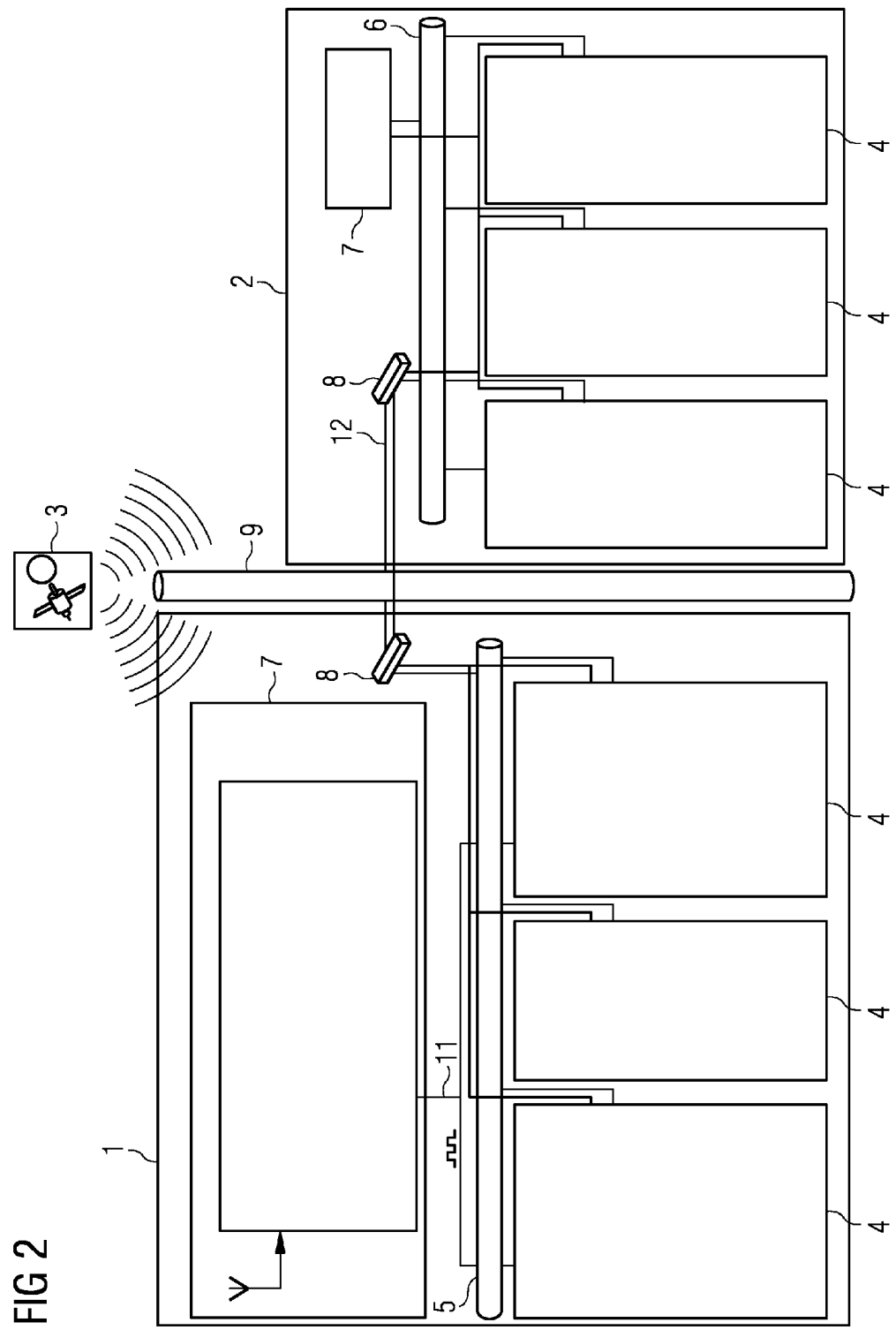
FIG. 2 shows a second embodiment of a wind park using the method of the invention.

FIG. 2 shows a second embodiment of a wind park using the method of the invention. The second embodiment differs from the first in that the wind turbines 1 does not comprise a time server. The time server of the substation 2 may be a NTP server. A further difference between the first and second embodiments is that a Pulse Per Second signal 11 is sent from the satellite-based clock 7 of the wind turbine 1 to some of the nodes 4 of the wind turbine in addition to a second time signal 12 coming from a central time server of the substation 2. The Pulse Per Second signal 11 provides very good accuracy. Where constraints are relaxed, the second time signal 12 may be used for timestamping. Accordingly only some of the nodes 4 of the wind turbine 1 need to receive the Pulse Per Second signal 11. The nodes 4 that receive the Pulse Per Second signal 11 also receive the second time signal 12 and combine the two signals for timestamping. The combination benefits from the very high accuracy of the Pulse Per Second signal 11 while the second time signal 12 provides for a synchronisation between the different wind turbines 1 of the wind park.

Figure 3:
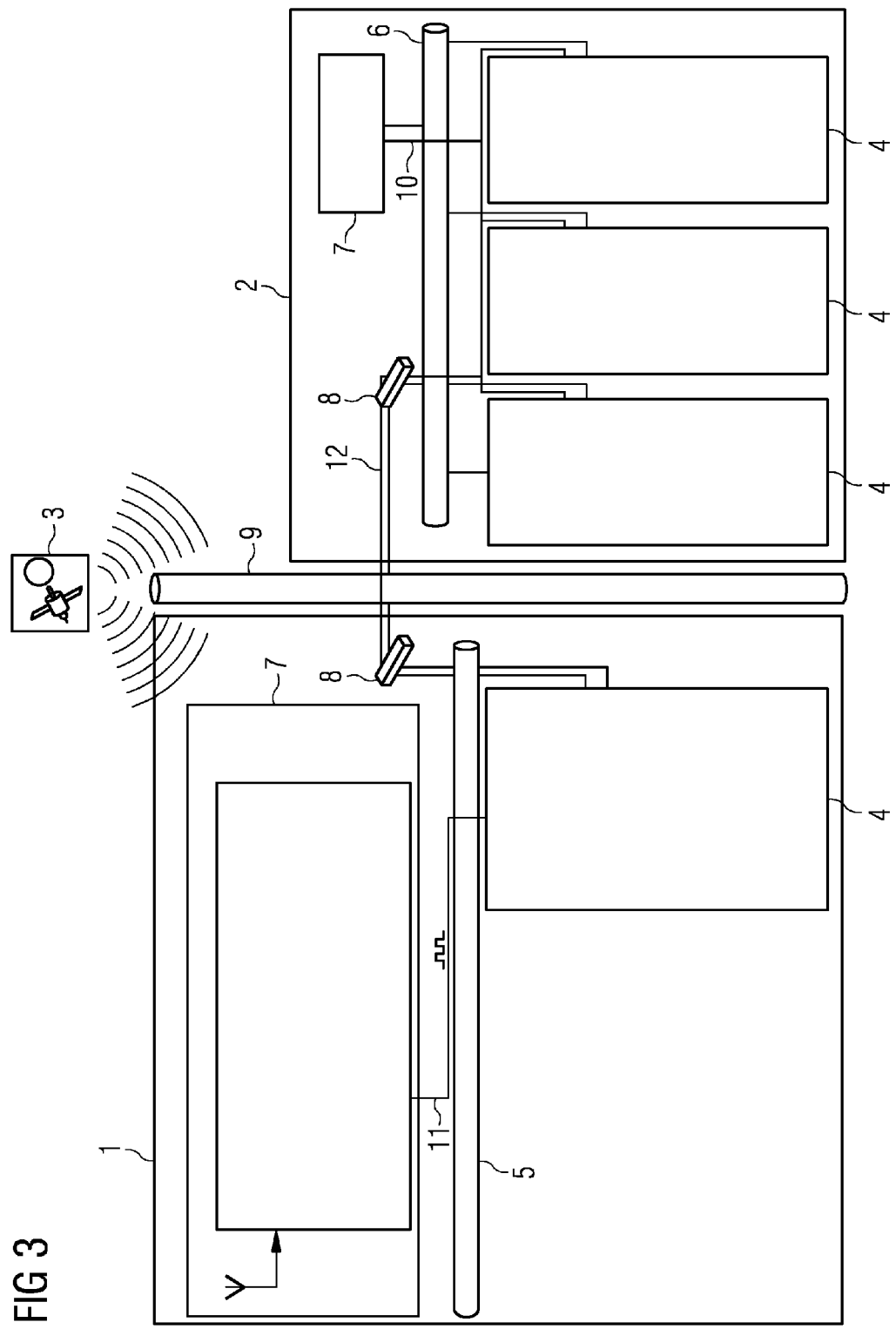
FIG. 3 shows a third embodiment of a wind park using the method of the invention.

FIG. 3 shows a third embodiment of a wind park using the method of the invention. According to the third embodiment all nodes 4 of the wind turbine receive both the Pulse Per Second signal from the satellite-based clock 7 of the wind turbine and the time signal from the central time server located in the substation 2. Preferably both signals are used for timestamping without deriving a third time signal by combining the two signals. This requires less effort for the timestamping itself. The two time signals can be combined offline yielding the desired precise time information.

FIG. 4 shows a fourth embodiment of a wind park using the method of the invention. According to the fourth embodiment each node 4 in the wind turbine 1 comprises a satellite-based clock 7. A central time server in the substation 2 is provided for synchronising the nodes of the wind turbines 1 with each other. Processes running on nodes locally in the wind turbine 1 can retrieve time either directly from the satellite-based clock 7 or from the local clock which is synchronised to the central time server in the substation 2 depending on the required accuracy. The fourth embodiment is very robust because all nodes have access to a local time signal even when the wind park network 9 fails.

While the invention has been described by referring to preferred embodiments and illustrations thereof, it is to be understood that the invention is not limited to the specific form of the embodiments shown and described herein, and that many changes and modifications may be made thereto within the scope of the appended claims by one of ordinary skill in the art.

We claim:

1. A method of collecting event data in a wind park installation including a plurality of wind turbines, the method comprising:
    providing a plurality of wind turbines, each of the plurality of wind turbines including a respective satellite-based clock;
    distributing a first time signal from the respective satellite-based clock to a node in the wind turbine for each wind turbine in the plurality of wind turbines;
    detecting respective events by the node happening in a subsystem connected to the node;
    collecting respective pieces of event data by the node comprising an information about the respective events;
    for each piece of collected event data, adding a timestamp to the respective pieces of collected event data characterizing a corresponding instant of time when the event was detected;
    storing the timestamped event data;
    providing a central time server in a substation of the wind park installation and distributing a second time signal from the central time server to the node of each wind turbine, wherein accuracy of the first time signal from the respective satellite-based clock is higher relative to accuracy of the second time signal from the central time server;
    wherein the adding of the timestamp to the respective pieces of collected event data comprises adding a first timestamp based on the first time signal and a second timestamp based on the second time signal;
    based on a time accuracy requirement associated with each respective piece of event data, selecting the first timestamp based on the first time signal for respective pieces of event data associated with a first time accuracy requirement, and selecting the second timestamp based on the second time signal for respective pieces of event data associated with a second time accuracy requirement, wherein the second time accuracy requirement is less than the first time accuracy requirement.

2. The method of claim 1, wherein the respective satellite-based clock is a Global Positioning System based clock.

3. The method of claim 2, wherein the respective Global Positional System based clock in each of the plurality of wind turbines is a Pulse Per Second clock of the GPS receiver.

4. The method of claim 1,
further comprising providing a local time server in each of the wind turbines, and
wherein distributing the first time signal includes synchronizing the local time server to the respective satellite-based clock and providing the first time signal from the synchronized local time server to the node.

5. The method of claim 4, wherein providing the first time signal from the synchronized local time server to the node is done by means of Precision Time Protocol.

6. The method of claim 1, wherein distributing the second time signal is done by means of Network Time Protocol.

7. The method of claim 1, further comprising providing a local clock in the node of each wind turbine and synchronizing the local clock to the central time server.

8. The method of claim 1,
wherein each wind turbine comprises a first group of nodes and a second group of nodes, and
wherein the first group of nodes add the first timestamp to the respective collected event data collected by the first group of nodes and the second group of nodes add the second timestamp to the respective collected event data collected by the second group of nodes.

9. The method of claim 1,
further comprising combining the first and the second time signals to create a third time signal,
wherein adding the timestamp comprises adding a third timestamp based on the third time signal.

10. A plurality of wind turbines in a wind park installation, each of the plurality of wind turbines comprising:
a respective satellite-based clock comprising a respective Global Positioning System (GPS) receiver;
a node adapted to detect events happening in a subsystem connected to the node, to collect event data comprising an information about the events, to add a timestamp to each piece of collected event data characterizing a corresponding instant of time when the event was detected and to store the timestamped event data;
providing a central time server in a substation of the wind park installation and distributing a time signal from the central time server to the node of each wind turbine, wherein accuracy of a time signal from the respective satellite-based clock is higher relative to accuracy of the time signal from the central time server;
wherein an adding of the timestamp to the respective pieces of collected event data comprises adding a first timestamp based on the time signal from the respective satellite-based clock and a second timestamp based on the time signal from the central time server; and
based on a time accuracy requirement associated with each respective piece of event data, selecting the first timestamp based on the time signal from the respective satellite-based clock for respective pieces of event data associated with a first time accuracy requirement, and selecting the second timestamp based on the time signal from the central time server for respective pieces of event data associated with a second time accuracy requirement, wherein the second time accuracy requirement is less than the first time accuracy requirement.

* * * * *